US011880154B2

(12) United States Patent
Kitaguchi

(10) Patent No.: US 11,880,154 B2
(45) Date of Patent: Jan. 23, 2024

(54) IMAGE FORMING SYSTEM AND SHEET CONVEYANCE METHOD

(71) Applicant: KONICA MINOLTA, INC., Tokyo (JP)

(72) Inventor: Tatsuya Kitaguchi, Tokyo (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 17/742,860

(22) Filed: May 12, 2022

(65) Prior Publication Data

US 2022/0373956 A1 Nov. 24, 2022

(30) Foreign Application Priority Data

May 18, 2021 (JP) ................................ 2021-083841

(51) Int. Cl.
*G03G 15/20* (2006.01)
*G03G 15/00* (2006.01)

(52) U.S. Cl.
CPC ..... *G03G 15/5062* (2013.01); *G03G 15/5016* (2013.01); *G03G 15/6573* (2013.01); *G03G 2215/047* (2013.01)

(58) Field of Classification Search
CPC .......... G03G 15/5012; G03G 15/5016; G03G 15/5062; G03G 15/55; G03G 15/6573; G03G 2215/047
See application file for complete search history.

(56) References Cited

U.S. PATENT DOCUMENTS

2014/0292881 A1* 10/2014 Moritaku ............ B41J 2/16585 347/16
2019/0354054 A1* 11/2019 Yamamoto ......... G03G 15/5062

FOREIGN PATENT DOCUMENTS

JP 2008074051 A 4/2008

* cited by examiner

*Primary Examiner* — Hoang X Ngo
(74) *Attorney, Agent, or Firm* — Holtz, Holtz & Volek PC

(57) ABSTRACT

An image forming system includes: an image former that forms a label image on a long sheet conveyed in a sheet conveyance direction on a basis of a print job; an image defect detector that detects an image defect of the label image that is formed; and a sheet conveyer that conveys the long sheet in accordance with the label image where the image defect is detected after execution of the print job has been completed.

18 Claims, 8 Drawing Sheets

IMAGE FORMING SYSTEM AND SHEET CONVEYANCE METHOD

CROSS REFERENCE TO RELATED APPLICATIONS

The entire disclosure of Japanese Patent Application No. 2021-083841 filed on May 18, 2021 is incorporated herein by reference in its entirety.

BACKGROUND

Technological Field

The present invention relates to an image forming system and a sheet conveyance method.

Description of Related Art

Generally, in image forming apparatuses (such as printers, copiers and facsimiles) that use electrophotographic process technology, laser light based on image data is applied (exposed) to a uniformly charged photoconductor (for example, photosensitive drum) to form an electrostatic latent image on the photoconductor surface. Then, toner is supplied to the photoreceptor on which the electrostatic latent image is formed to visualize the electrostatic latent image and form a toner image. This toner image is transferred directly or indirectly via an intermediate transcriber to a sheet in an imaging device, and then heated and pressurized in a fusing device to form an image on the sheet.

In addition, an image forming system is now in practical use that includes a sheet feeder that feeds a continuous sheet such as continuous roll sheet and folded sheet (hereinafter referred to as "long sheet") to this image forming system, and a sheet discharge unit that stores the long sheet on which images have been formed by the image forming system.

A label roll sheet with a sticker on the reverse side is often used as a long sheet in imaging systems. For example, this label roll sheet is made by applying a label (label base material) with an adhesive (also referred to as glue) layer on the back surface on a release sheet on which release agent such as silicon is applied. Labels are used by peeling off the release sheet and attaching it to the object after the label image is formed on the surface.

In the related art, users have manually checked whether an image defect is caused in the label image formed on the label. However, there was a problem that the manual check resulted in individual differences in the criteria for the occurrence of image defects, and that it took a great deal of time to check whether an image defect is caused in the label image in the entire label roll sheet.

In relation to the above problem, Japanese Patent Application Laid-Open No. 2008-74051 proposes a technology in which when an abnormal image is detected, the execution of the print job is interrupted and the recording media is conveyed in the reverse direction to perform additional printing for an abnormal image for the purpose of reducing the load of the user.

According to Japanese Patent Application Laid-Open No. 2008-74051, it is possible to check for the occurrence of image defects based on a uniform standard that does not allow for individual differences, and there is no need for the user to check whether the label image has an image defect in the entire label roll sheet.

However, in the technology described in Japanese Patent Application Laid-Open No. 2008-74051, each time an abnormal image is detected, the execution of the print job is interrupted and a preparatory process (conveying the recording media in the opposite direction) is performed to perform additional printing on the abnormal image, which increases the execution time of the print job and reduces the productivity of image formation.

SUMMARY

An object of the present invention is to provide an image forming system and a sheet conveyance method that can prevent reduction of the productivity of image formation.

To achieve the abovementioned object, an image forming system reflecting one aspect of the present invention includes: an image former that forms a label image on a sheet conveyed in a sheet conveyance direction on a basis of a print job; an image defect detector that detects an image defect of the label image that is formed; and a sheet conveyer that conveys the sheet in accordance with the label image where the image defect is detected after execution of the print job has been completed.

To achieve the abovementioned object, a sheet conveyance method reflecting one aspect of the present invention includes: forming a label image on a sheet conveyed in a sheet conveyance direction on a basis of the print job; detecting an image defect of the label image that is formed; and conveying the sheet in accordance with the label image where the image defect is detected, after execution of the print job has been completed.

BRIEF DESCRIPTION OF DRAWINGS

The advantages and features provided by one or more embodiments of the invention will become more fully understood from the detailed description given hereinbelow and the appended drawings which are given by way of illustration only, and thus are not intended as a definition of the limits of the present invention.

DETAILED DESCRIPTION OF EMBODIMENTS

Hereinafter, one or more embodiments of the present invention will be described with reference to the drawings. However, the scope of the invention is not limited to the disclosed embodiments.

Figure 1:
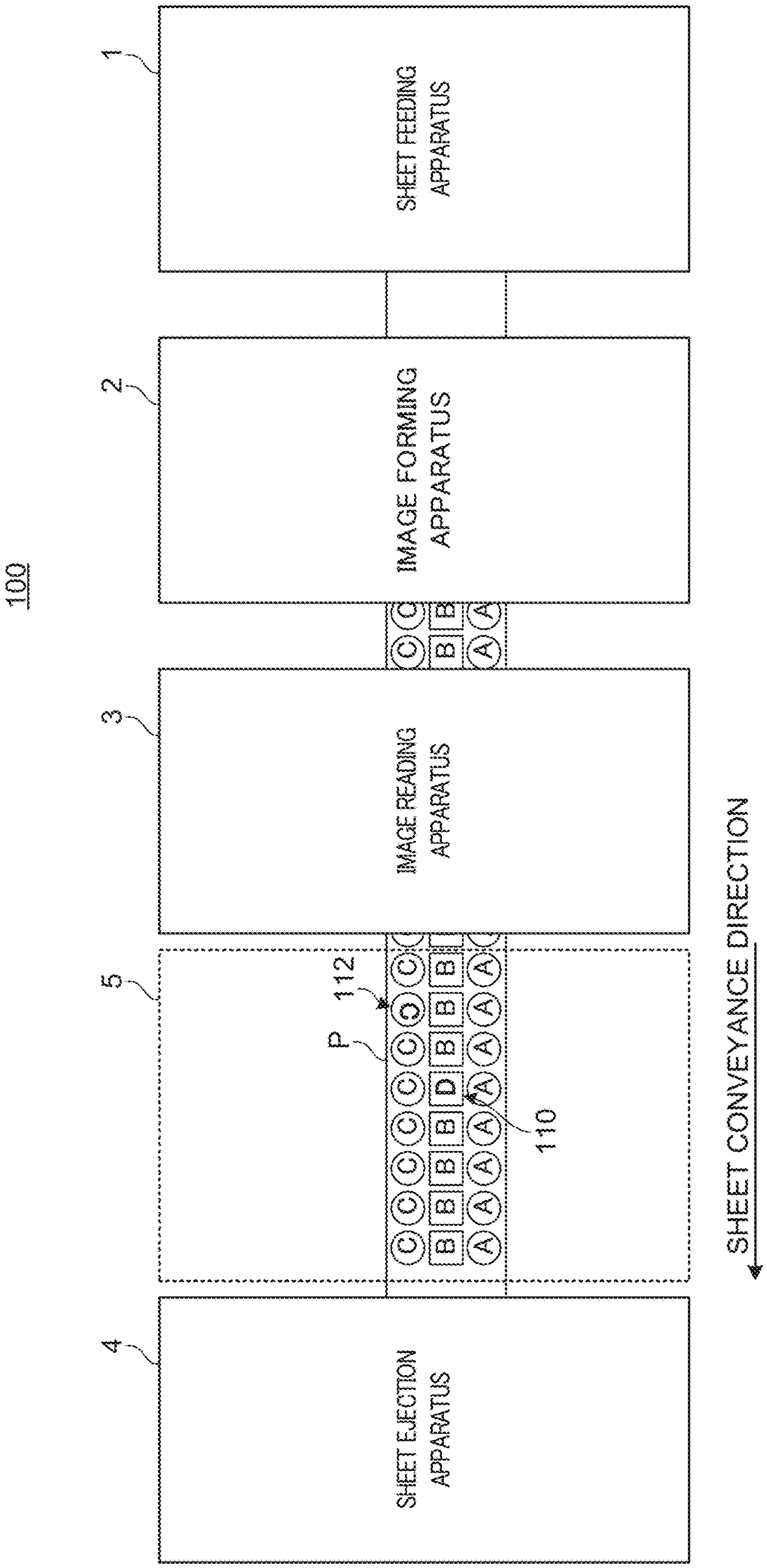
FIG. 1 is a diagram illustrating an example of a configuration of an image forming system.

The present embodiment is elaborated below with reference to the drawings. FIG. 1 is a schematic diagram illustrating an entire configuration of image forming system 100 according to the present embodiment as viewed from above.

Figure 2:
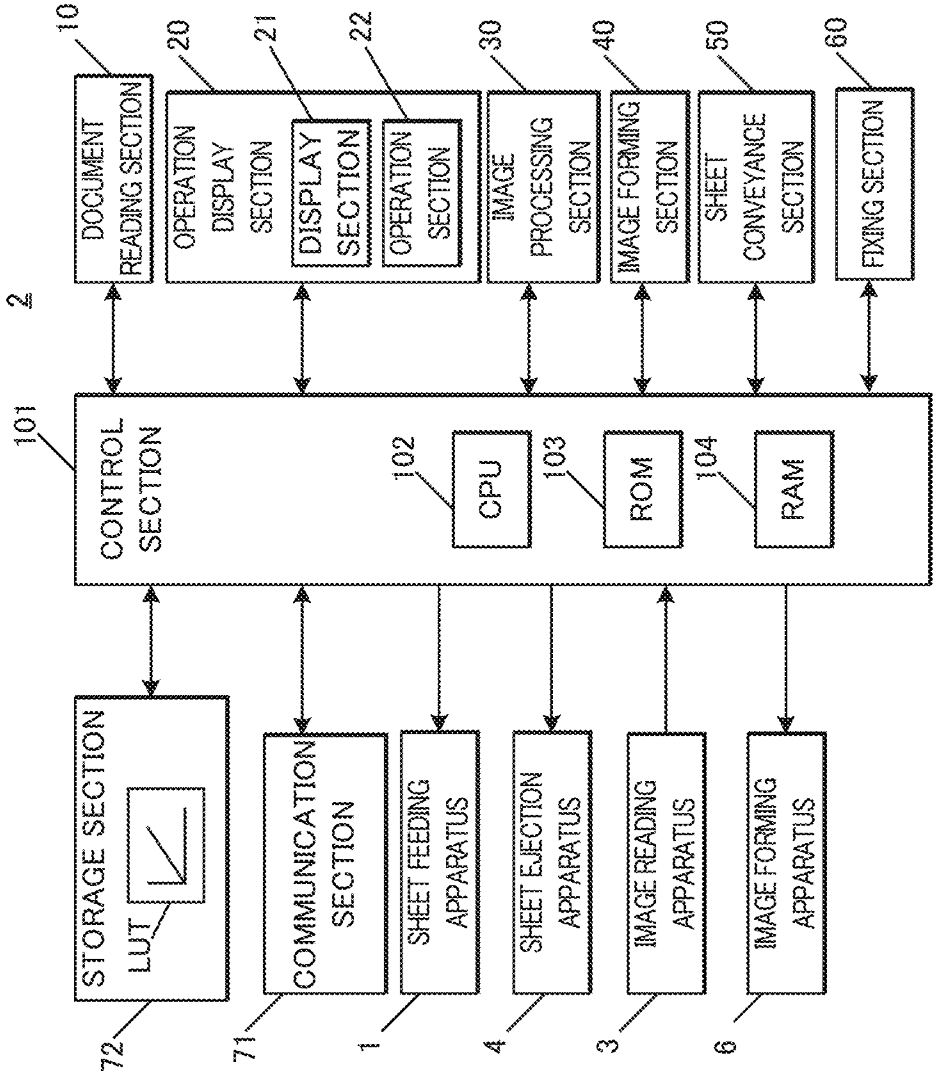
FIG. 2 is a block diagram illustrating a functional configuration of the image forming system.

FIG. 2 illustrates a principal part of a control system of image forming apparatus 2 provided in image forming system 100 according to the present embodiment.

Image forming system 100 is, for example, a system that use, as a recording medium, long sheet P (which corresponds to "sheet" of the embodiment of the present invention) with a length greater than the width of the main body of image forming apparatus 2 in the conveyance direction, and forms an image (label image) such as pictures, graphics, symbols (letters) and barcodes on long sheet P on the basis of print job information representing a print job (image formation process) related to the image formation. As long sheet P, label roll sheets with sticker on the back side are often used. For example, this label roll sheet is made by applying a label (label base material) with an adhesive (also referred to as glue) layer on the back surface on a release sheet on which release agent such as silicon is applied. Labels are used by peeling off the release sheet and attaching it to the object after the label image is formed on the surface.

As illustrated in FIG. 1, in image forming system 100, sheet feeding apparatus 1, image forming apparatus 2 (which functions as "image former" of the embodiment of the present invention), image reading apparatus 3 (which functions as "image defect detector" of the embodiment of the present invention) and sheet ejection apparatus 4 are connected from the upstream side in the conveyance direction of long sheet P (hereinafter referred to also as "sheet conveyance direction").

Sheet feeding apparatus 1 is an apparatus that feeds long sheet P to image forming apparatus 2. In the housing of sheet feeding apparatus 1, long sheet P in a roll form is wound around a support shaft and held in a rotatable manner. Sheet feeding apparatus 1 conveys long sheet P wound around the support shaft at a constant speed to image forming apparatus 2 through a plurality of paired conveyance rollers (for example, a delivery roller, a sheet feed roller and the like). The sheet feeding operation of sheet feeding apparatus 1 is controlled by control section 101 provided in image forming apparatus 2.

Note that in sheet feeding apparatus 1, long sheet P need not necessarily be held in a roll form, and a plurality of long sheets P with a predetermined size (for example, 210 [mm]× 1200 [mm]) may be held.

Image forming apparatus 2 forms an image on long sheet P through an electrophotographic process. As illustrated in FIG. 2, image forming apparatus 2 includes control section 101, document reading section 10, operation display section 20, image processing section 30, image forming section 40, sheet conveyance section 50, fixing section 60, communication section 71, and storage section 72.

Control section 101 includes central processing unit (CPU) 102, read only memory (ROM) 103, random access memory (RAM) 104 and the like. CPU 102 reads a program corresponding to the process from ROM 103, loads it to RAM 104, and performs a centralized control of the operation of each block of image forming apparatus 2 in conjunction with the loaded program. At this time, various data stored in storage section 72 is referred to. Storage section 72 is composed of a nonvolatile semiconductor memory (so-called flash memory) and/or a hard disk drive, for example. Note that storage section 72 functions as "location information storage" of the embodiment of the present invention.

Control section 101 transmits and receives various data to and from an external apparatus (for example personal computer) connected to communication networks such as a local area network (LAN) and a wide area network (WAN), through communication section 71. Control section 101 receives image data sent from an external apparatus, and forms a label image on long sheet P on the basis of the image data (input image data), for example. Communication section 71 is composed of a communication control card such as a LAN card, for example.

Document reading section 10 reads a document conveyed on the contact glass by optically scanning the document and forming an image of the reflection light from the document on the light reception surface of a charge coupled device (CCD) sensor. Note that the conveyance of the document onto the contact glass is performed by an auto document feeder (ADF), while the document may be manually placed on the contact glass.

Operation display section 20 is composed of a liquid crystal display (LCD) with a touch panel, and functions as display section 21 and operation section 22, for example. Display section 21 indicates various operation screens, operation statuses of each function and the like in accordance with a display control signal input from control section 101. Operation section 22 includes various operation keys such as numeric keys and start key, receives various inputting operations by the user, and outputs it to operation signal control section 101.

Image processing section 30 includes a circuit that performs an analog digital (A/D) conversion process and a circuit that performs a digital image process. Image processing section 30 generates digital image data from an analog image signal acquired by the CCD sensor of document reading section 10 through an A/D conversion process, and outputs it to image forming section 40.

Image forming section 40 forms an electrostatic latent image on the photoconductor drum by emitting laser light on the basis of digital image data generated by image processing section 30, and irradiating the photoconductor drum with the emitted laser light (exposing step).

Image forming section 40 includes configurations for executing a charging step that is performed before the exposing step, a development step that is performed after the exposing step, a transferring step after the development step, and a cleaning step after the transferring step, in addition to the above-mentioned exposing step.

In the charging step, image forming section 40 uniformly charges the surface of the photoconductor drum through corona discharging from the charging device. In the development step, image forming section 40 forms a toner image (label image) on the photoconductor drum by attaching the toner included in the developer in the developing device to the electrostatic latent image on the photoconductor drum.

In the transferring step, image forming section 40 performs primary transfer of the toner image on the photoconductor drum to the intermediate transfer belt (not illustrated). In addition, image forming section 40 performs secondary transfer of the toner image on the intermediate transfer belt to long sheet P conveyed by sheet conveyance section 50. In the cleaning step, image forming section 40 removes the toner remaining on the photoconductor drum after the transferring step.

Fixing section 60 includes a fixing roller and a pressure roller. The pressure roller is disposed in the state where it is in pressure contact with the fixing roller. A fixing nip portion is formed at the contact portion between the fixing roller and the pressure roller. Fixing section 60 applies heat and pressure to the toner image on long sheet P introduced to the fixing nip portion (thermal fixing), to fix the toner image to long sheet P fix (fixation step). As a result, a fixed toner image is formed on long sheet P. Long sheet P on which thermal fixation is performed by fixing section 60 is ejected to the outside of image forming apparatus 2.

Image reading apparatus 3 conveys long sheet P ejected from image forming apparatus 2, optically reads the label image formed on long sheet P by image forming apparatus 2, and detects the image defect of the label image by comparing the read label image with the reference image. Then, image reading apparatus 3 transmits detection result information representing the detection result of the image defect of the label image, to control section 101 provided in image forming apparatus 2.

Sheet ejection apparatus 4 is an apparatus that winds up long sheet P conveyed from image reading apparatus 3. In the housing of sheet ejection apparatus 4, long sheet P is wound around the support shaft and held in a roll form, for example. As such, sheet ejection apparatus 4 winds long sheet P conveyed from image reading apparatus 3 around the support shaft at a constant speed, through a plurality of paired conveyance rollers (for example, a delivery roller and a sheet ejection roller). The winding operation of sheet ejection apparatus 4 is controlled by control section 101 provided in image forming apparatus 2. Post-processing such as die-cutting and cutting is performed on long sheet P wound by sheet ejection apparatus 4 at a post-processing apparatus (not illustrated), for example. Note that sheet feeding apparatus 1, image forming apparatus 2, image reading apparatus 3 and sheet ejection apparatus 4 function as "sheet conveyer" of the embodiment of the present invention.

Figure 3:
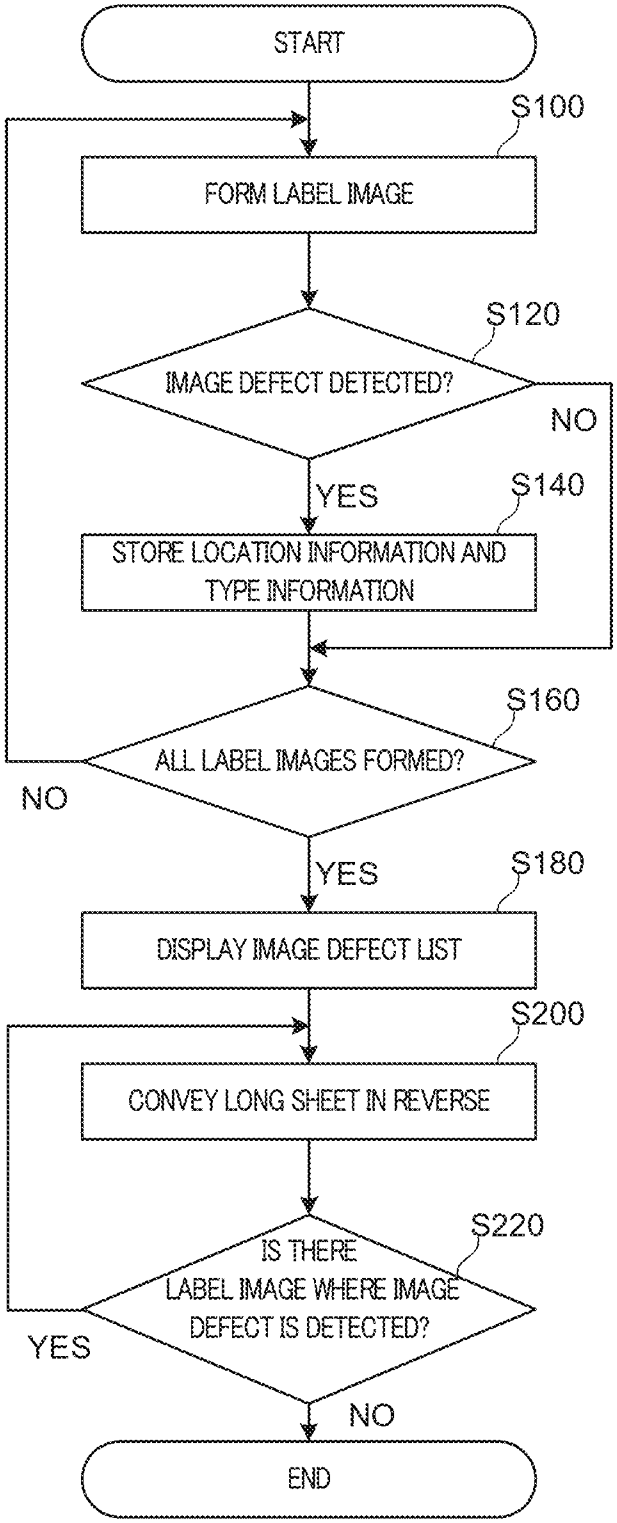
FIG. 3 is a flowchart of an example of an operation of the image forming system.

Next, an example of an operation of image forming system 100 (which corresponds to "sheet conveyance method" of the embodiment of the embodiment of the present invention) is described with reference to a flowchart of FIG. 3. Note that the process illustrated in FIG. 3 is executed each time when image forming apparatus 2 receives print job information transmitted from an external apparatus and including input image data, for example.

First, control section 101 (image forming apparatus 2) forms a label image on long sheet P conveyed in the sheet conveyance direction on the basis of the print job represented by the received print job information (step S100).

Next, control section 101 determines whether the image defect of the label image has been detected by image reading apparatus 3 by referring to the detection result information sent from image reading apparatus 3 (step S120). When the determination result indicates that no image defect of the label image is detected (step S120, NO), the process is advanced to step S160.

On the other hand, when an image defect of the label image is detected (step S120, YES), control section 101 causes storage section 72 to store location information representing the position on long sheet P (the position in the sheet conveyance direction and the position in the width direction) of the label image where the image defect is detected, and type information representing the type of the image defect (such as positional displacement, abnormal density, smudge, and chipping) (step S140). Thereafter, the process is advanced to step S160.

In the example illustrated in FIG. 1, image reading apparatus 3 detects the image defect of label images 110 and 112 formed by image forming apparatus 2 on long sheet P, and transmits the detection result information representing the detection result to control section 101 provided in image forming apparatus 2. Then, control section 101 causes storage section 72 to store the location information representing the position on long sheet P of label images 110 and 112 where the image defect is detected, and the type information representing the type of the image defect. In the location information, the position in the sheet conveyance direction (sixth, 300 mm from the first label image) and the position in the width direction (middle position) are indicated regarding label image 110. In addition, in the location information, the position in the sheet conveyance direction (eighth, 400 mm from the first label image) and the position in the width direction (upper position) are indicated regarding label image 112.

At step S160, control section 101 determines whether all label images have been formed on long sheet P, i.e., whether the execution of the print job has been completed (step S160). When the determination result indicates that all label images have not been formed on long sheet P (step S160, NO), the process returns to step S100.

Figure 7:
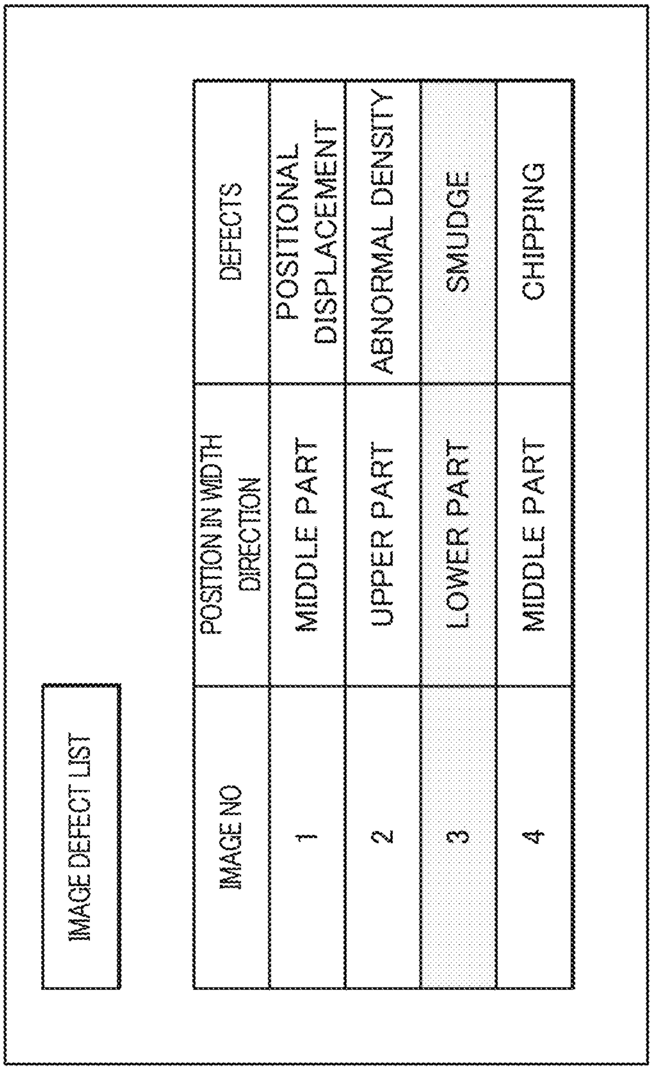
FIG. 7 is a diagram illustrating an example of a display of an image defect list.

On the other hand, when all label images have been formed on long sheet P (step S160, YES), control section 101 transfers to an image defect recovery mode to control and cause display section 21 (which functions as "notifier" of the embodiment of the embodiment of the present invention) to display an image defect list representing the detection result of the image defect on the basis of the location information and the type information stored in storage section 72, to thereby provide a notification that the image defect of the label image has been detected (step S180). In the present embodiment, the image defect list includes, for each label image where the image defect is detected, the image No for uniquely specifying the label image, the position in the width direction on long sheet P, and the type of the image defect (see FIG. 7).

Next, by referring to the location information stored in storage section 72, control section 101 performs a control of conveying long sheet P in the direction opposite to the sheet conveyance direction such that the label image located on the most upstream side in the sheet conveyance direction in the label image where the image defect is detected is located at (within) replacing section 5 (see FIG. 1) (step S200). In other words, when image defects of a plurality of label images are detected, control section 101 conveys long sheet P in the direction opposite to the sheet conveyance direction in the order of the label image, where the image defect is detected, whose position on the conveyance path is closest to replacing section 5 such that the label image where the image defect is detected is located at replacing section 5 for the purpose of minimizing the conveyance time of long sheet P. Replacing section 5 is a region provided between image reading apparatus 3 and sheet ejection apparatus 4 on the conveyance path of long sheet P, and configured for the user to visually recognize the label with the label image where the image defect is detected, and to perform an operation of replacing the label with a label provided with a label image with no image defect. In the present embodiment, the label provided with a label image with no image defect is preliminarily prepared by preliminarily forming, on another long sheet P, the same label image as the label image where the image defect is detected.

Figure 4:
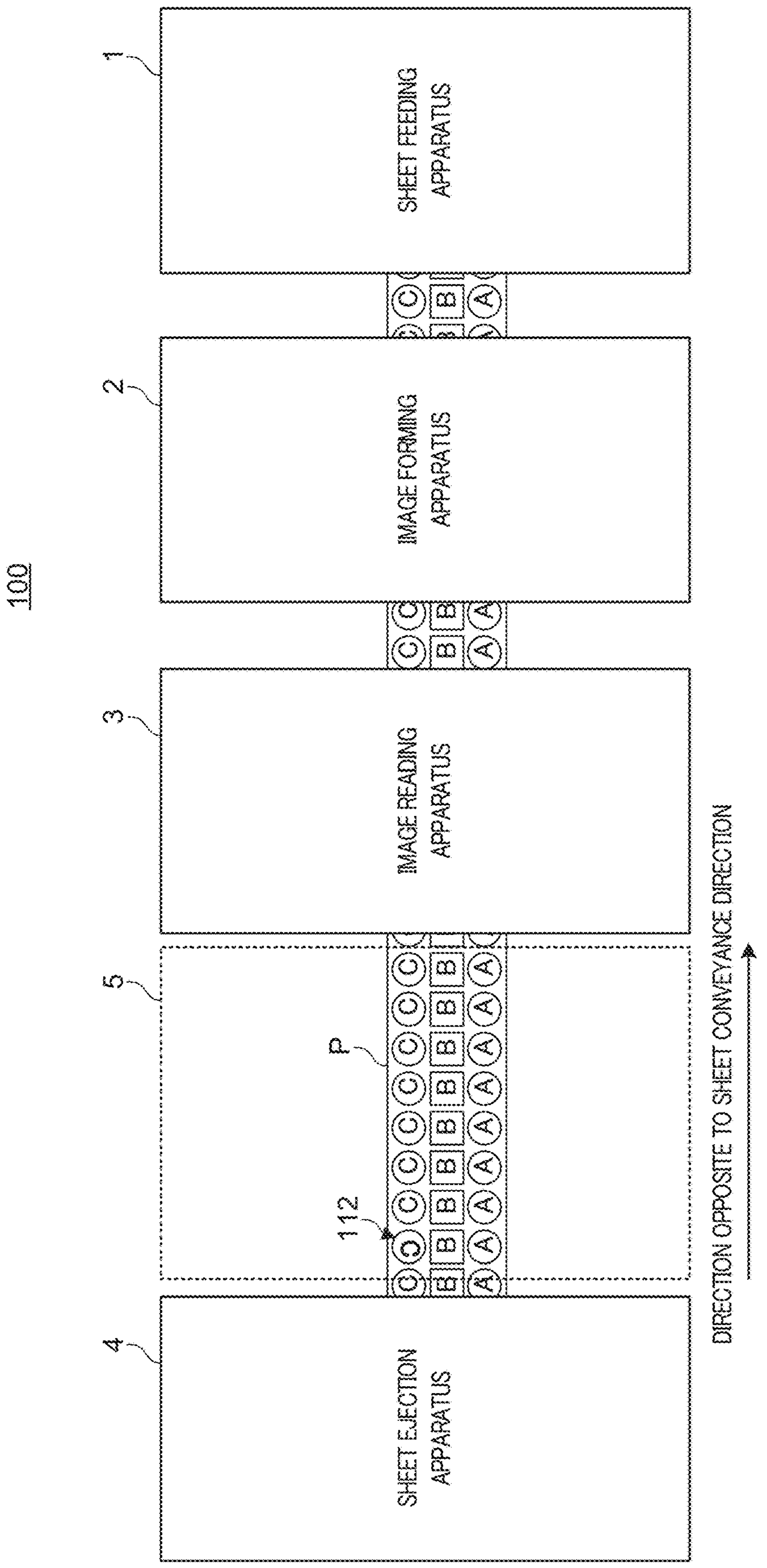
FIG. 4 is a diagram illustrating an operation of conveying a sheet in a direction opposite to a sheet conveyance direction.

FIG. 4 illustrates a state after long sheet P is conveyed in the direction opposite to the sheet conveyance direction such that label image 112 where an image defect is detected is located at replacing section 5. In this case, the user performs an operation of replacing the label with label image 112 where an image defect is detected, with a preliminarily prepared label provided with a label image with no image defect. Note that from the viewpoint of increasing the efficiency of the label replacing operation, it is desirable to convey long sheet P in the direction opposite to the sheet conveyance direction such that as many label images where the image defect is detected as possible are located at replacing section 5 so that the replacing operation can be simultaneously performed on many labels.

Finally, control section 101 determines whether there is another label image where the image defect is detected that is not replaced and is located on the most upstream side in the sheet conveyance direction, by referring to the location information stored in storage section 72 (step S220). When the determination result indicates that there is another label image that is not replaced and is located on the most upstream side in the sheet conveyance direction (step S220, YES), the process returns to step S200.

On the other hand, when there is no label image that is not replaced and is located on the most upstream side in the sheet conveyance direction (step S220, NO), image forming system 100 terminates the process illustrated in FIG. 3.

As has been elaborated above, image forming system 100 of the present embodiment includes the image image forming section (image forming apparatus 2) that forms a label image on long sheet P conveyed in the sheet conveyance direction on the basis of the print job, the image defect detecting section (image reading apparatus 3) that detects the image defect of the formed label image, and the sheet conveyance section (sheet feeding apparatus 1, image forming apparatus 2, image reading apparatus 3, and sheet ejection apparatus 4) that conveys long sheet P in accordance with the label image where the image defect is detected after the execution of the print job has been completed.

More specifically, image forming system 100 includes the location information storage section (storage section 72) that stores the location information representing the position on long sheet P of the label image where the image defect is detected. After the execution of the print job has been completed, the sheet conveyance section conveys long sheet P in the direction opposite to the sheet conveyance direction in accordance with the position represented by the location information.

According to the above-mentioned configuration of the present embodiment, long sheet P is conveyed in the direction opposite to the sheet conveyance direction in accordance with the position represented by the location information after the execution of the print job has been completed unlike the known technique (PTL 1) in which when an abnormal image is detected, the execution of the print job is interrupted and the recording media is conveyed in the reverse direction to perform additional printing for an abnormal image. As such, it does not perform the preparation process (the process of conveying long sheet P in the direction opposite to the sheet conveyance direction) for performing the operation of replacing the label with the label image where the image defect is detected by interrupting the execution of the print job each time when an image defect is detected, and thus longer execution time of the print job and reduced image formation productivity can be prevented.

Note that while long sheet P is conveyed in the direction opposite to the sheet conveyance direction in accordance with the location information representing the position on long sheet P of the label image where the image defect is detected in the present embodiment, the present invention is not limited to this. For example, image forming system 100 may include a marking section that provides a long sheet P with a mark (for example, x mark) indicating the position on long sheet P of the label image where the image defect is detected. In this case, control section 101 conveys long sheet P in the direction opposite to the sheet conveyance direction such that the label image where the image defect is detected is located at replacing section 5 in accordance with the provided mark. A specific example of the marking section includes image forming apparatus 2 that provides a mark by forming, on long sheet P, a mark indicating the position on long sheet P of the label image where the image defect is detected.

In addition, image forming system 100 may include an image data storage section that stores image data representing the label image where the image defect is detected. In this case, control section 101 conveys long sheet P in the direction opposite to the sheet conveyance direction such that the label image where the image defect is detected is located at replacing section 5 in accordance with the label image where image defect is detected that is represented in the image data. A specific example of the image data storage section includes storage section 72.

In addition, in the present embodiment, it is desirable to convey long sheet P in the direction opposite to the sheet conveyance direction in the state where the paired conveyance rollers (the fixing roller and the pressure roller) that form the fixing nip portion are separated from each other. The reason for this is to prevent unnecessary conveyance damage to the long sheet P when long sheet P passes through the paired conveyance rollers that form the fixing nip portion, while the image formation process, and in turn, the fixation process, are not performed when long sheet P is conveyed in the direction opposite to the sheet conveyance direction.

In addition, in the present embodiment, long sheet P may be conveyed in the direction opposite to the sheet conveyance direction in accordance with the label image where the image defect is detected at the timing designated by the user after the execution of the print job has been completed. In this manner, the user can convey long sheet P in the direction opposite to the sheet conveyance direction at a timing when the user can peel off the label with the label image where the image defect is detected and replace the label with a label provided with a label image with no image defect.

In addition, in the present embodiment, image forming apparatus 2 may form a label image (label image for replacement) on long sheet P on the basis of image data representing the label image with no image defect to correspond to the label image where the image defect is detected. In this case, an example of the position where the label image is to be formed on long sheet P includes a position on the most upstream side in the sheet conveyance direction in the non-image forming region of the long sheet P.

In addition, in the present embodiment, image forming system 100 may include image forming apparatus 6 (which functions as "second image former" of the embodiment of the present invention) that forms a label image (label image for replacement) on long sheet P on the basis of image data representing the label image with no image defect to correspond to the label image where the image defect is detected (see FIG. 2). In this case, control section 101 transmits, to image forming apparatus 6, the image data representing the label image with no image defect to correspond to the label image where the image defect is detected.

Figure 5:
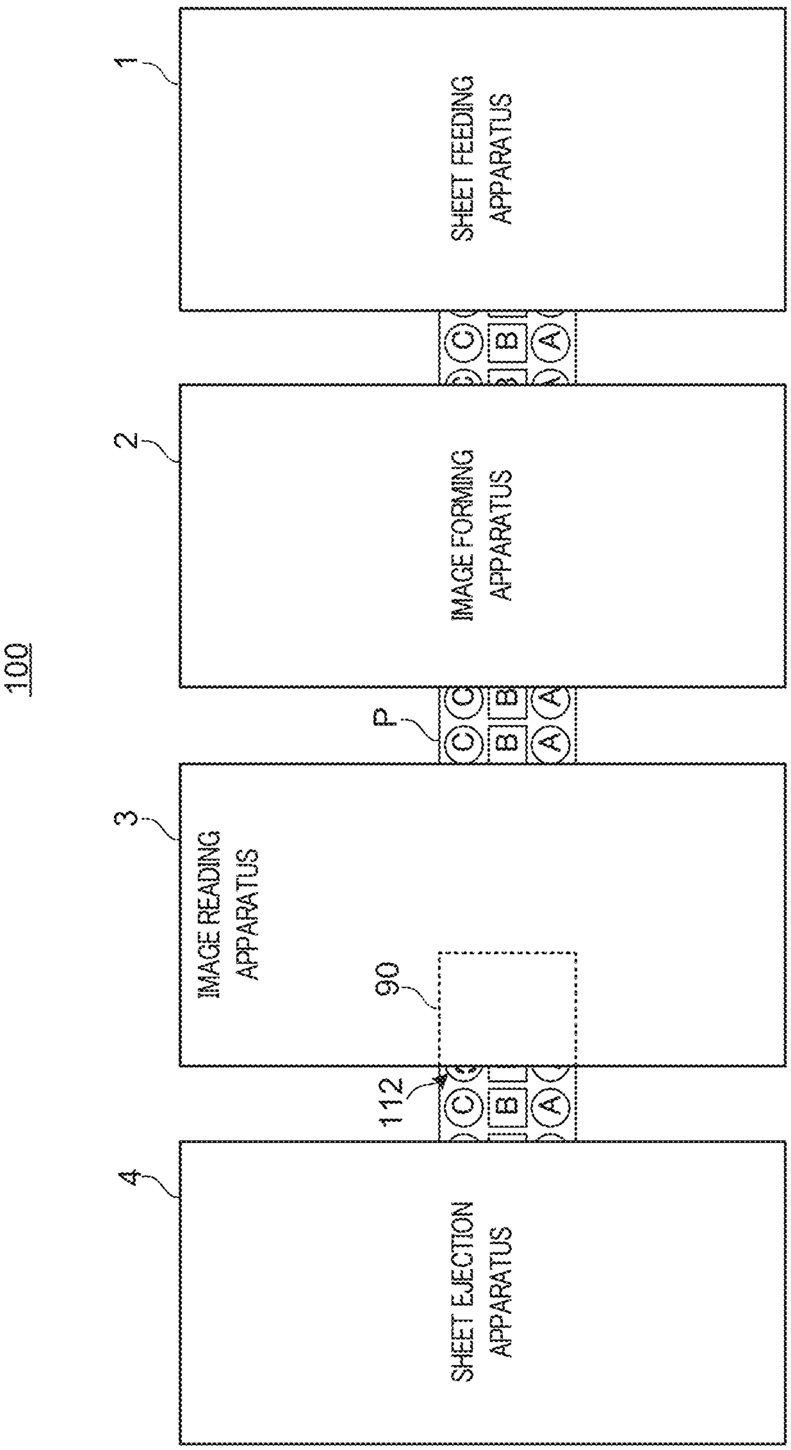
FIG. 5 is a diagram illustrating a modification of the configuration of the image forming system.

In addition, in the present embodiment, in the case where the distance between the apparatuses making up image forming system 100 is small and replacing section 5 cannot be sufficiently provided, replacing section 5 may be provided on the conveyance path in sheet feeding apparatus 1, image forming apparatus 2 (image forming section), image reading apparatus 3 (image defect detecting section) or sheet ejection apparatus 4. FIG. 5 illustrates an example in which replacing section 5 is provided on the conveyance path in image reading apparatus 3. More specifically, detachable attaching/detaching section 90 is provided in the housing of image reading apparatus 3. When attaching/detaching section 90 is removed and attached, replacing section 5 appears, and a control of conveying long sheet P in the direction opposite to the sheet conveyance direction such that the label image where the image defect is detected is located at replacing section 5 is performed. Alternatively, a slidable sliding section may be provided in the housing of image reading apparatus 3 such that replacing section 5 appears when the sliding section is slid, and that a control of conveying long sheet P in the direction opposite to the sheet conveyance direction such that the label image where the image defect is detected is located at replacing section 5 is performed.

In addition, in the present embodiment, on the basis of image data corresponding to a label image where an image defect (such as chipping and low image density) is detected and representing an image with no image defect, image forming apparatus 2 may form an image on the label with the label image where the image defect is detected. That is, instead of performing an operation of replacing the label with the label image where the image defect is detected, it is possible to form an image on the label with the label image where the image defect is detected (additional printing) so as to eliminate the image defect.

Figure 6:
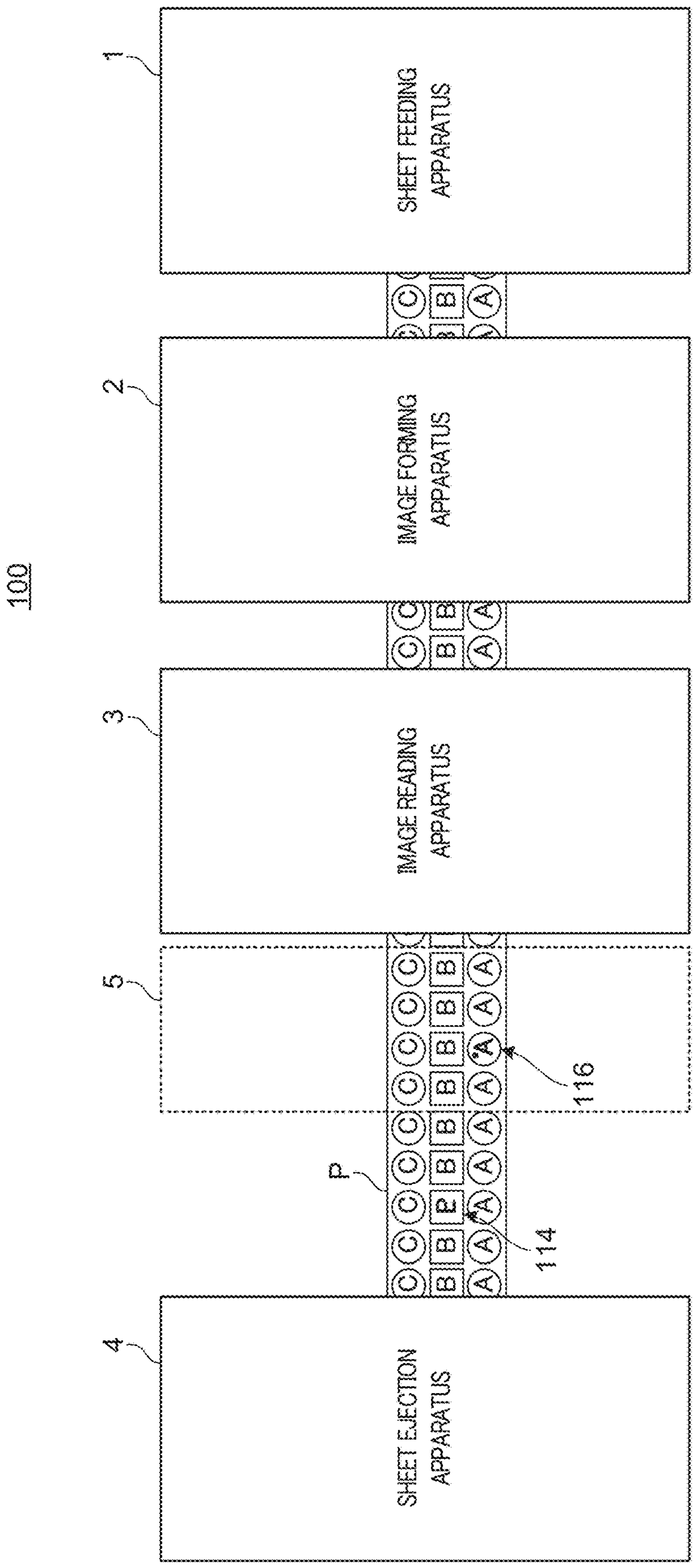
FIG. 6 is a diagram illustrating a modification of the operation of conveying a sheet in a direction opposite to a sheet conveyance direction.

In addition, in the present embodiment, in the case where image defects of a plurality of label images are detected and the image defect list representing the detection result of the image defects is displayed, it may be displayed (notified) in display modes (notification mode) that differ depending on the position of the label images on the conveyance path. FIG. 6 illustrates a state after long sheet P is conveyed in the direction opposite to the sheet conveyance direction such that label image 116 where the image defect is detected is located at replacing section 5 when image defects of a plurality of label images 114 and 116 are detected. In this case, when displaying the image defect list representing the detection result of the image defect, control section 101 uses the display mode that differs between label image 114 that is not located at replacing section 5 and label image 116 that is located at replacing section 5. More specifically, when displaying the image defect list representing the detection result of the image defect, control section 101 highlights label image 116 located at replacing section 5 (see the row of image No 3 in FIG. 7). In this manner, by checking the image defect list, the user can easily recognize label image 116 located at replacing section 5, i.e., the label image to be subjected to the label replacing operation. Note that when displaying the image defect list representing the detection result of the image defect, control section 101 may display a sentence representing that label image 116 is located at replacing section 5.

Figure 8:
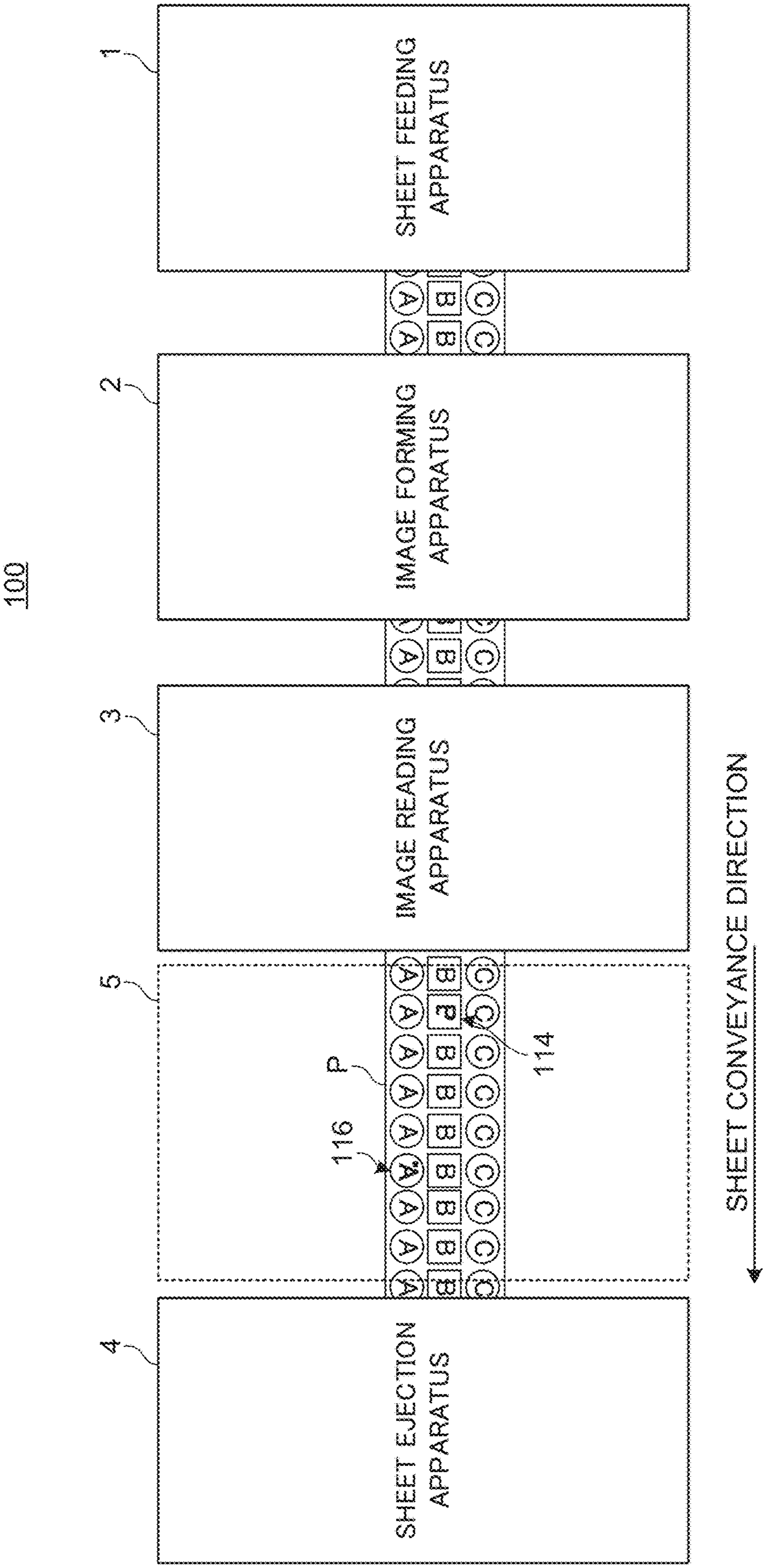
FIG. 8 is a diagram illustrating an operation of conveying a sheet in the sheet conveyance direction.

In addition, in the present embodiment, in the state where image forming system 100 is not configured to be able to convey long sheet P in the direction opposite to the sheet conveyance direction, long sheet P where all label images are formed that is wound by sheet ejection apparatus 4 may be set to sheet feeding apparatus 1 again to convey long sheet P in the same direction as the sheet conveyance direction such that the label image where the image defect is detected is located at replacing section 5 by referring to the location information stored in storage section 72, as illustrated in FIG. 8. In this case, control section 101 conveys long sheet P in the same direction as the sheet conveyance direction such that the label image where the image defect is detected is located at replacing section 5 by taking into account the fact that the position of each label image on long sheet P is an upside-down position set by turning 180 degrees the position of forming each label image on long sheet P.

The above-mentioned embodiments are only examples of embodiments in implementing the invention, and the technical scope of the invention should not be interpreted as limited by these embodiments. In other words, the invention can be implemented in various forms without departing from its gist or its main features.

Although embodiments of the embodiment of the present invention have been described and illustrated in detail, the disclosed embodiments are made for purpose of illustration and example only and not limitation. The scope of the present invention should be interpreted by terms of the appended claims.

What is claimed is:

1. An image forming system comprising:

an image former that forms, based on a print job, a label image on a sheet conveyed in a sheet conveyance direction;

an image defect detector that detects whether an image defect exists in the label image formed by the image former; and a sheet conveyer that conveys the sheet based on a label image with respect to which an image defect is detected, after execution of the print job has been completed.

2. The image forming system according to claim 1, wherein after the execution of the print job has been completed, the sheet conveyer conveys the sheet in a direction opposite to the sheet conveyance direction based on the label image with respect to which the image defect is detected.

3. The image forming system according to claim 1, further comprising a location information storage that stores location information representing a position on the sheet of the label image with respect to which the image defect is detected, wherein the sheet conveyer conveys the sheet based on the position represented by the location information.

4. The image forming system according to claim 1, further comprising a marker that provides the sheet with a mark representing a position on the sheet of the label image with respect to which the image defect is detected, wherein the sheet conveyer conveys the sheet based on the mark provided by the marker.

5. The image forming system according to claim 1, further comprising an image data storage that stores image data representing the label image with respect to which the image defect is detected, wherein the sheet conveyer conveys the sheet based on the label image represented in the image data.

6. The image forming system according to claim 1, wherein the sheet conveyer conveys the sheet in a state in which paired conveyance rollers that form a fixing nip portion are separated from each other.

7. The image forming system according to claim 1, wherein the sheet conveyer conveys the sheet based on the label image with respect to which the image defect is detected, at a timing designated by a user, after the execution of the print job has been completed.

8. The image forming system according to claim 1, wherein the image former forms a label image on the sheet based on image data representing a label image with no image defect to correspond to the label image with respect to which the image defect is detected.

9. The image forming system according to claim 1, further comprising a second image former that forms a label image on the sheet based on image data representing a label image with no image defect to correspond to the label image with respect to which the image defect is detected.

10. The image forming system according to claim 1, further comprising a replacer that is provided on a conveyance path of the sheet and performs an operation of replacing a label on which the label image with respect to which the image defect is detected is formed, wherein the sheet conveyer conveys the sheet such that the label image with respect to which the image defect is detected is located at the replacer after the execution of the print job has been completed.

11. The image forming system according to claim 10, wherein the replacer is provided on the conveyance path in the image former, the image defect detector, or the sheet conveyer.

12. The image forming system according to claim 10, wherein when image defects of a plurality of the label images are detected, the sheet conveyer conveys the sheet such that the label image closest to the replacer, from among the plurality of the label images with respect to which image defects were detected, is located at the replacer.

13. The image forming system according to claim 1, wherein the image former forms an image on a label on which the label image with respect to which the image defect is detected is formed, based on image data representing a label image with no image defect, to correspond to the label image with respect to which the image defect is detected.

14. The image forming system according to claim 1, further comprising a notifier that provides a notification that the image defect has been detected.

15. The image forming system according to claim 14, wherein the notifier provides a notification of a position, in a width direction on the sheet, of the label image with respect to which the image defect is detected.

16. The image forming system according to claim 14, wherein the notifier provides a notification of a type of the image defect of the label image that is detected.

17. The image forming system according to claim 14, wherein when image defects of a plurality of the label images are detected, the notifier provides a notification in a notification mode that differs depending on a position of the label image on a conveyance path of the sheet.

18. A sheet conveyance method comprising:

forming, based on a print job, a label image on a sheet conveyed in a sheet conveyance direction;

detecting whether an image defect exists in the label image formed in the forming; and conveying the sheet based on a label image with respect to which an image defect is detected, after execution of the print job has been completed.

* * * * *